United States Patent
Kakeya et al.

(10) Patent No.: US 10,044,016 B2
(45) Date of Patent: Aug. 7, 2018

(54) STORAGE BATTERY

(71) Applicants: GS Yuasa International Ltd., Kyoto-shi, Kyoto (JP); KYOTO UNIVERSITY, Kyoto (JP)

(72) Inventors: Tadashi Kakeya, Kyoto (JP); Kenichi Saito, Tokyo (JP); Akiyoshi Nakata, Kyoto (JP); Hajime Arai, Kyoto (JP); Zempachi Ogumi, Kyoto (JP)

(73) Assignees: GS Yuasa International Ltd., Kyoto (JP); KYOTO UNIVERSITY, Kyoto (JP)

( * ) Notice: Subject to any disclaimer, the term of this patent is extended or adjusted under 35 U.S.C. 154(b) by 29 days.

(21) Appl. No.: 15/214,126

(22) Filed: Jul. 19, 2016

(65) Prior Publication Data
US 2017/0033345 A1 Feb. 2, 2017

(30) Foreign Application Priority Data
Jul. 30, 2015 (JP) .................. 2015-151179

(51) Int. Cl.
| | | |
|---|---|---|
| *H01M 2/16* | (2006.01) | |
| *H01M 4/24* | (2006.01) | |
| *H01M 10/24* | (2006.01) | |
| *H01M 10/26* | (2006.01) | |
| *H01M 4/38* | (2006.01) | |
| *H01M 4/40* | (2006.01) | |

(Continued)

(52) U.S. Cl.
CPC ......... *H01M 2/164* (2013.01); *H01M 2/1653* (2013.01); *H01M 4/24* (2013.01); *H01M 10/24* (2013.01); *H01M 10/26* (2013.01); *H01M 4/382* (2013.01); *H01M 4/405* (2013.01); *H01M 10/052* (2013.01); *H01M 10/0567* (2013.01); *H01M 10/30* (2013.01); *H01M 2300/0014* (2013.01); *Y02E 60/122* (2013.01); *Y02E 60/124* (2013.01)

(58) Field of Classification Search
CPC ........... H01M 10/052; H01M 10/0567; H01M 10/24; H01M 10/26; H01M 10/30; H01M 2300/0014; H01M 2/164; H01M 2/1653; H01M 4/24; H01M 4/382; H01M 4/405
See application file for complete search history.

(56) References Cited

U.S. PATENT DOCUMENTS

2002/0102466 A1* 8/2002 Hwang ............... H01M 4/13 429/326
2003/0215707 A1 11/2003 O Hara
(Continued)

FOREIGN PATENT DOCUMENTS

EP 0085111 A1 8/1983
EP 0392982 A2 10/1990
(Continued)

*Primary Examiner* — Carlos Barcena
(74) *Attorney, Agent, or Firm* — Rankin, Hill & Clark LLP

(57) ABSTRACT

A storage battery includes a negative electrode including, as an active material, at least one of a metal capable of forming a dendrite and a metal compound thereof, a positive electrode, a separator, and an electrolyte containing an additive. In the storage battery, a concentration of the additive in the electrolyte in a region on a side of the negative electrode defined by the separator is higher than a concentration of the additive in a region on a side of the positive electrode.

11 Claims, 3 Drawing Sheets

(51) Int. Cl.
  *H01M 10/052*     (2010.01)
  *H01M 10/0567*    (2010.01)
  *H01M 10/30*      (2006.01)

(56) References Cited

U.S. PATENT DOCUMENTS

| | | |
|---|---|---|
| 2014/0066528 A1 | 3/2014 | Asazawa |
| 2014/0342209 A1* | 11/2014 | He .................. H01M 10/056 429/101 |
| 2015/0214591 A1 | 7/2015 | Mizuhata |

FOREIGN PATENT DOCUMENTS

| | | |
|---|---|---|
| JP | 58024303 A2 | 2/1983 |
| JP | 60051503 A2 | 3/1985 |
| JP | 60136182 A2 | 7/1985 |
| JP | 61242603 A2 | 10/1986 |
| JP | 61277430 A2 | 12/1986 |
| JP | 64-081823 A2 | 3/1989 |
| JP | 3000119 A2 | 1/1991 |
| JP | 5131124 A2 | 5/1993 |
| JP | 6246141 A2 | 9/1994 |
| JP | 8130034 A2 | 5/1996 |
| JP | 2003297375 A2 | 10/2003 |
| JP | 2005123059 A2 | 5/2005 |
| JP | 2009093983 A2 | 4/2009 |
| JP | 2013084349 A1 | 5/2013 |
| JP | 2014044908 A2 | 3/2014 |
| JP | 2014049352 A2 | 3/2014 |
| JP | 2014199815 A2 | 10/2014 |

* cited by examiner

STORAGE BATTERY

CROSS-REFERENCE TO RELATED APPLICATIONS

This application claims the benefit of Japanese patent application No. 2015-151179 filed on Jul. 30, 2015, which is incorporated by reference.

FIELD

The present invention relates to a storage battery.

BACKGROUND

In recent years, in association with size reduction and weight saving of electronic equipment, demands for a high energy density battery as a power supply are increasingly growing. A storage battery in which a metal such as lithium, zinc or the like is contained in the negative active material has an advantage that energy density per unit mass and power density are high. Such storage batteries are studied to be used practically as a power supply of electronic equipment and vehicles.

However, there is a problem that a dendrite may grow from the metal such as lithium and zinc contained in the negative active material to cause shortage due to penetration of a separator and the dendrite causes a charge-discharge cycle life to decrease. Thus, an additive is conventionally added to an electrolyte against such a problem.

JP-A-2013-84349 discloses "an electrolyte solution for an alkaline battery, wherein the electrolyte solution contains at least an organic substance having two or more carbon atoms and one or more hydroxyl groups in its molecule." See claim 1.

It is an object of JP-A-2013-84349 "to provide an electrolyte solution for an alkaline battery and an alkaline battery which suppress generation of a hydrogen gas produced by a side reaction, a dendrite formed when zinc is precipitated, and a change in shape of zinc and can realize a prolonged charge-discharge cycle and an excellent charge-discharge efficiency." See paragraph [0007].

Further, it is disclosed that "the number of hydroxyl groups is preferably 5 or less", and a monohydric alcohol, a dihydric alcohol and a trihydric alcohol which have 2 to 6 carbon atoms are exemplified as the organic substance. See paragraphs [0017], [0019] and [0020].

JP-A-2009-93983 discloses "a secondary battery in which a negative electrode and a positive electrode are arranged with an electrolyte solution interposed therebetween, wherein the negative electrode includes, as a negative active material, a material which absorbs/releases metal ions, and the electrolyte solution includes at least one dendrite forming inhibitor selected from the group consisting of polyalkylene imines, polyallylamines and asymmetrical dialkyl sulfones." See claim 1. Also, it is disclosed that "the negative electrode includes a material selected from the group consisting of zinc, magnesium, aluminum and an alloy thereof." See claim 6.

It is a main object of JP-A-2009-93983 "to provide a secondary battery capable of performing charge-discharge repeatedly suppressing formation of a dendrite." See paragraph [0005].

Further, it is disclosed that in a zinc-air battery including, as an electrolyte solution, a 6N hydroxy aqueous solution containing polyethyleneimine (PEI) added in an amount of 1 wt %, the formation of a dendrite is suppressed and charge-discharge could be performed repeatedly. See paragraph [0018].

JP-A-2003-297375 discloses "an alkaline zinc battery including a negative electrode containing zinc or a zinc alloy as a negative active material, a positive electrode, a separator, and an alkaline electrolyte solution, wherein the alkaline electrolyte solution is formed by including a cationic organic substance in a 10 wt % to 30 wt % potassium hydroxide aqueous solution." See claim 1. Further, it is proposed that the cationic organic substance is "any one or more of a quaternary ammonium salt, a quaternary phosphonium salt, and a tertiary sulfonium salt," and "the alkaline zinc battery . . . which is a secondary battery." See claims 2 and 7.

It is an object of JP-A-2003-297375 "to realize an alkaline zinc secondary battery which prevents expansion and liquid leakage of a battery associated with generation of a hydrogen gas, and an internal short-circuit due to nonuniform growth of dendric or spongy zinc in a zinc negative electrode, and is excellent in liquid leakage and a cycle life." See paragraph [0076].

Further, in Example of alkaline zinc secondary battery, "n-dodecyl trimethyl ammonium chloride" and a long chain alkyl trimethyl ammonium salt are disclosed for the cationic organic substance to be added to an electrolyte solution. See paragraphs [0171] to [0245]. Further, it is proposed that "it is preferred that a concentration of a potassium hydroxide aqueous solution is set to 30 wt % or less in order to surely dissolve the cationic organic substance in 0.1M or more and a saturated amount or less." See paragraph [0216]. Also, it is disclosed that "it is found that liquid leakage and an internal short-circuit of the alkaline zinc secondary battery are significantly suppressed when the number of carbon atoms of the long chain alkyl group of the cationic organic substance is 3 or more," and "however, when the substituent has 15 or more carbon atoms, particularly 21 or more carbon atoms, a discharge capacity is reduced, and therefore the number of carbon atoms of the long chain alkyl group of the cationic organic substance is 3 to 20, and particularly preferably 3 to 15." See paragraph [0229].

JP-A-2014-199815 discloses "an electrode surface coating forming agent including a nitrile compound." See paragraph [0001]. As a problem to be solved, it is shown that "an improvement of stability of an electrolyte solution at high-temperature is required in order to improve the safety of a lithium ion battery." See paragraph [0003]. With respect to the nitrile compound, it is disclosed that "charge-discharge efficiency can be increased because a stable protective film is formed on the surface of the electrode by these compounds," and "further, a dendrite phenomenon of lithium metal can be suppressed by the stable protective film." See paragraph [0051]. Also, it is disclosed that "a compound having a nitrile group used for the electrode surface coating forming agent of the present invention may be used alone; however, it is contained in an organic solvent-based electrolyte solution commonly used in an amount of usually about 0.1 to 80 wt %, preferably about 1 to 50 wt %, and more preferably about 5 to 30 wt %." See paragraph [0052].

In JP-A-2014-44908, with respect to "a metal air battery" in which an electrode active material is "metal zinc" (claims 1, and 11), it is disclosed that "the air electrode 6 may be disposed so as to be in contact with an ion-exchange membrane 8 which is in contact with an electrolyte solution 3 stored in an electrolyte solution tank 1," and "the ion-exchange membrane 8 may be an anion exchange membrane." Further, it is disclosed that "since the anion exchange membrane has a cation group serving as a fixed ion, the cation in the electrolyte solution cannot conduct to the air electrode 6. In contrast with this, since hydroxide ions produced at the air electrode 6 are anions, they can conduct to the electrolyte solution. From this, a battery reaction of a metal air battery 45 can proceed, and the cation in the electrolyte solution 3 can be prevented from moving to the air electrode 6. From this, precipitation of metal or a carbonate compound at the air electrode 6 can be suppressed."

JP-A-8-130034 discloses "a Li secondary battery, wherein the battery has a positive electrode layer on a porous insulating film side and a negative electrode layer on a cation exchange membrane side of a separator composed of the electrolyte solution-retainable porous insulating film and the cation exchange membrane." See claim 1. As a problem to be solved, it is shown that "a problem of a shortened battery life is significant as lithium or a lithium alloy, particularly a lithium alloy in which lithium is rich is used for the negative electrode for the purpose of improving an electromotive force or a charge-discharge capacity." See paragraph [0003]. Further, it is disclosed that "addition of a cation exchange membrane to a negative electrode layer side of a conventional separator made of a porous insulating film prevents or inhibits lithium from becoming a compound on the surface of the negative electrode to be precipitated." See paragraph [0008].

In JP-A-2005-123059, it is disclosed "an air zinc battery in which an air diffusing layer, a water-repellent film, a positive electrode catalyst layer, and a separator are layered in turn on a positive electrode case having air holes, and a gel-like zinc negative electrode housed in a negative electrode container is opposed to the positive electrode catalyst layer with the separator interposed therebetween, wherein the separator has a first layer made of a semipermeable membrane or a microporous membrane and a second layer made of a nonwoven fabric or a woven fabric, and the separator is arranged so that the second layer is positioned on the positive electrode catalyst layer side." (See claim 1.) Also, it is proposed that "the nonwoven fabric or the woven fabric arranged on the positive electrode catalyst layer side of the separator is excellent in liquid retainability compared with the semipermeable membrane and the microporous membrane, and water and hydroxide ions move smoothly by reducing contact resistance between the separator and the catalyst layer," and "particularly, it is possible to suppress an increase of internal resistance resulting from lack of an electrolyte solution in the separator on the catalyst layer side." See paragraph [0014].

JP-A-60-136182 discloses "an air battery including a gel-like zinc cathode formed by mixing an amalgamated zinc powder, an alkaline electrolyte solution and a gelating agent." Also, it is proposed that "the alkaline electrolyte solution includes sodium hydroxide or a potassium hydroxide aqueous solution, a concentration of the solution is 4 to 12 mold, a mixing ratio is set to a range of 0.3 to 3 wt %, the gelating agent includes a carboxyvinyl polymer having a molecular weight of 100000 to 5000000, and a mixing ratio of the gelating agent is 0.3 to 3 wt %."

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In JP-A-2013-84349, JP-A-2009-93983, JP-A-2003-297375 and JP-A-2014-199815, there are proposed that in storage batteries including, as a negative active material, a metal such as lithium or zinc capable of forming a dendrite, the formation of the dendrite is suppressed by a specific additive for reducing the solubility of the metal in the electrolyte.

However, since these additives are low in stability at a high potential, they are decomposed and disappear in a region on a positive electrode side to deteriorate charge-discharge efficiency, and therefore practical realization thereof is difficult.

JP-A-2014-44908 discloses that an anion exchange membrane for a separator is used in a metal air battery to prevent cations from moving to a positive electrode in an electrolyte to suppress precipitation of metal at a positive electrode.

JP-A-8-130034 discloses that it can be suppressed that lithium is precipitated as a compound on the surface of the negative electrode by arranging a separator made of a cation exchange membrane on a negative electrode side of a battery in which lithium or a lithium alloy is used in the negative electrode.

However, JP-A-2014-44908 and JP-A-8-130034 disclose no electrolyte in which an additive is added for suppressing the formation of dendrite in a storage battery.

JP-A-2005-123059 discloses a zinc-air battery in which a separator is arranged so that a first layer made of a semipermeable membrane or a microporous membrane is positioned on a gel-like zinc electrode side. Therefore it is said that in the zinc-air battery, a gelating agent is added to the electrolyte in contact with the semipermeable membrane on the zinc electrode side. However, as disclosed in JP-A-60-136182, the gelating agent of the zinc electrode is the additive having a molecular weight of 100000 to 5000000 to be added to an electrolyte and gelating the electrolyte, and therefore it is hard to think that the gelating agent moves to an air electrode side.

It is an object of the present invention to provide a storage battery having excellent charge-discharge performance by inhibiting an additive in an electrolyte for suppressing a formation of dendrite from decomposing/disappearing in a region on a positive electrode side or from causing a side reaction even when the storage battery includes a metal capable of forming dendrite in a negative active material.

A storage battery according to a first aspect of the present invention includes: a negative electrode including, as an active material, at least one of a metal capable of forming a dendrite and a metal compound thereof, a positive electrode; a separator; and an electrolyte containing an additive, wherein the additive can move in the electrolyte through diffusion or migration, and a concentration of the additive in the electrolyte in a region on a side of the negative electrode defined by the separator is higher than a concentration of the additive in a region on a side of the positive electrode.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
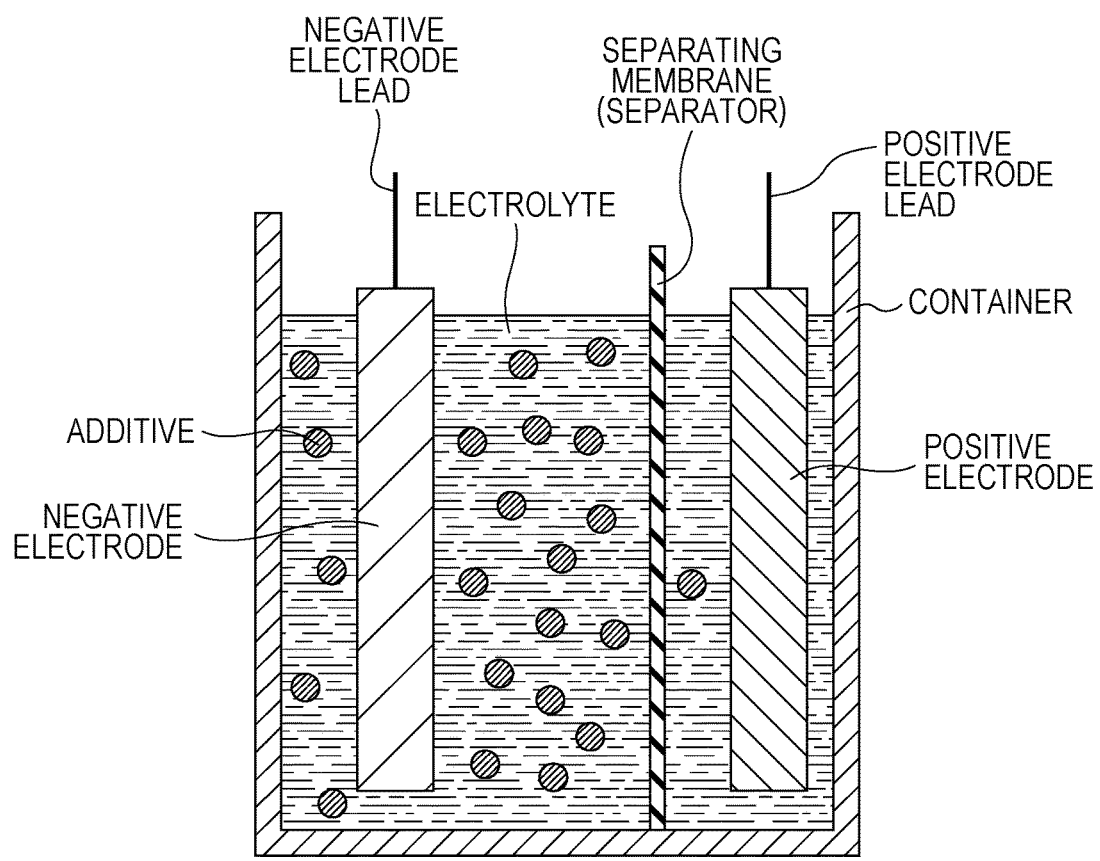
FIG. 1 shows a conceptual view of liquid separation in a storage battery according to the present invention.

A storage battery according to a first aspect of the present invention includes: a negative electrode including, as an active material, at least one of a metal capable of forming a dendrite and a metal compound thereof (a metal compound of the metal capable of forming a dendrite); a positive electrode; a separator; and an electrolyte containing an additive, wherein the additive can move in the electrolyte through diffusion or migration, and a concentration of the additive in the electrolyte in a region on a side of the negative electrode defined by the separator is higher than a concentration of the additive in a region on a side of the positive electrode.

The separator may be a semipermeable membrane.

The separator may be an ion-exchange membrane.

The additive may be a substance capable of enhancing charge-discharge characteristics of the negative electrode in the storage battery.

The additive may be a substance capable of reducing the solubility of the metal capable of forming a dendrite and a metal compound thereof in the electrolyte.

The additive may be an organic substance.

The viscosity of the electrolyte in the region on the negative electrode side may be 70 Pa·s or less.

The electrolyte may be an alkaline electrolyte solution.

The maximum operating voltage of the positive electrode may be 0.4 V or more relative to a potential of an electrode of Hg/HgO.

The separator may be an anion-exchange membrane.

The separator may be a grafted membrane.

The ion-exchange membrane may contain polyolefin as a substrate.

A storage battery according to another aspect of the present invention includes: a negative electrode including, as an active material, at least one of a metal capable of forming a dendrite and a metal compound thereof, a positive electrode; a separator; and an electrolyte containing an additive, wherein the electrolyte is liquid, and a concentration of the additive in the electrolyte in a region on a side of the negative electrode defined by the separator is higher than a concentration of the additive in a region on a side of the positive electrode.

It is possible to provide a storage battery having excellent charge-discharge cycle performance by employing means according to the present invention.

A storage battery according to the present invention has a negative electrode including, as an active material, at least one of a metal capable of forming a dendrite and a metal compound thereof, a positive electrode, a separator and an electrolyte containing an additive. The storage battery is configured in such a way that movement of the additive is suppressed by the separator and a concentration of the additive in the electrolyte in a region on a side of the negative electrode defined by the separator is higher than a concentration of the additive in a region on a side of the positive electrode. If the concentration of the additive in a region on the negative electrode side is even slightly higher than the concentration on the positive electrode side when the storage battery is left at rest without being charged or discharged, the effect of the present invention can be exerted. In addition, uneven distribution of ions or the additive in the electrolyte which is temporarily generated during charge-discharge of a storage battery is not included in the present invention because ions or the additive are uniformly diffused when the storage battery is not charged or discharged, resulting in decomposition on the positive electrode side.

In order to realize this battery structure, it is preferred to use, as a separator to isolate the positive electrode from the negative electrode, a membrane having such selective permeability that ions contributing to a battery reaction permeate a membrane but the permeability for the additive is lower than that for the ions. Further, it is more preferred to use a membrane (semipermeable membrane) having selective permeability based on a molecular weight. In the case of the semipermeable membrane, a flexibility of battery design can be increased since a molecular weight which can permeate the membrane can be relatively easily adjusted by adjusting a pore size or the like.

Further, the separator is more preferably an ion-exchange membrane because ions contributing to a battery reaction can easily permeate the ion-exchange membrane.

A conceptual view of the above battery structure is shown in FIG. 1. A separating membrane (separator) of FIG. 1 is preferably a semipermeable membrane or an ion-exchange membrane in which the permeability for the additive is lower than the permeability for the ions contributing to a battery reaction.

Here, the following permeation test was performed on a membrane formed by graft-polymerizing acrylic acid to a polyethylene film having a thickness of 25 μm used in experiments of the present invention (hereinafter, referred to as a "grafted membrane") as a test for verifying a selective permeability of the membrane to be used for the separator.

<Permeation Test>

Figure 2:
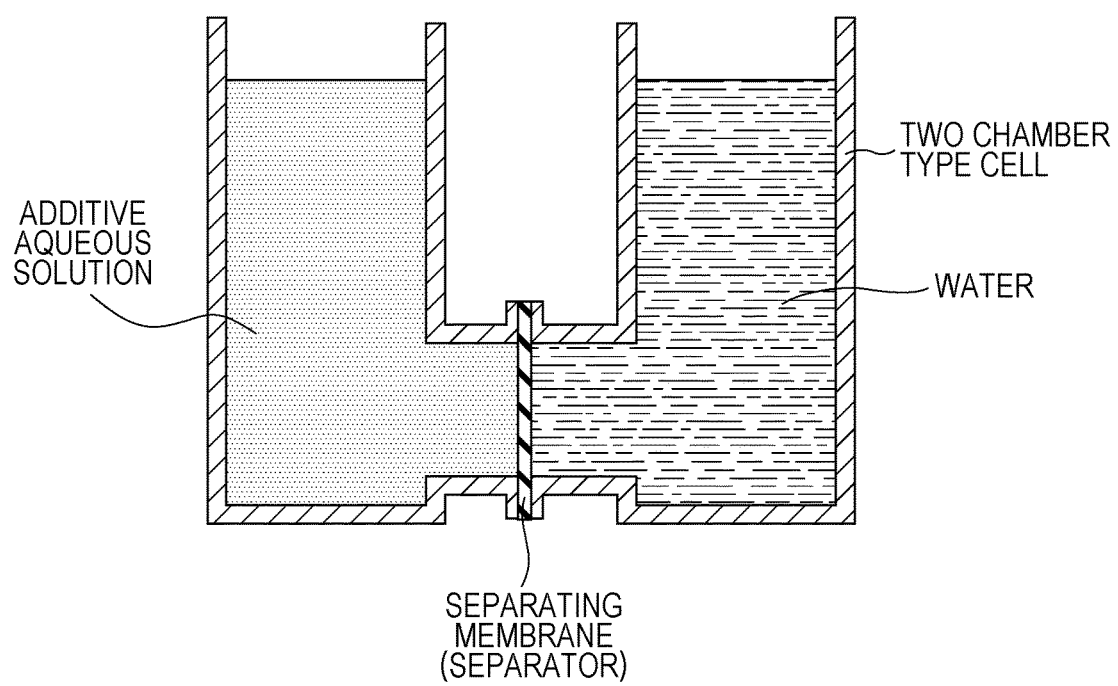
FIG. 2 shows a schematic view of a two chamber type cell used for a permeation test.

A two chamber type cell as shown in FIG. 2 was prepared, a separating membrane (separator) made of a grafted membrane of 12 cm in diameter (diameter of a communicating section of the two chamber type cell is 12 cm) was disposed between two chambers as a partition. 10 ml of water was put in one chamber and 10 ml of an aqueous solution in which each additive shown in Table 1 was dissolved in an amount of 10% by mass was put in the other chamber.

The two chamber type cell was stored at 25° C. for 10 days, and then an amount of carbon contained in water in the chamber in which the additive was not added was measured. Based on the measured carbon amount, a permeated amount equivalent to the content of the additive was determined.

Figure 3:
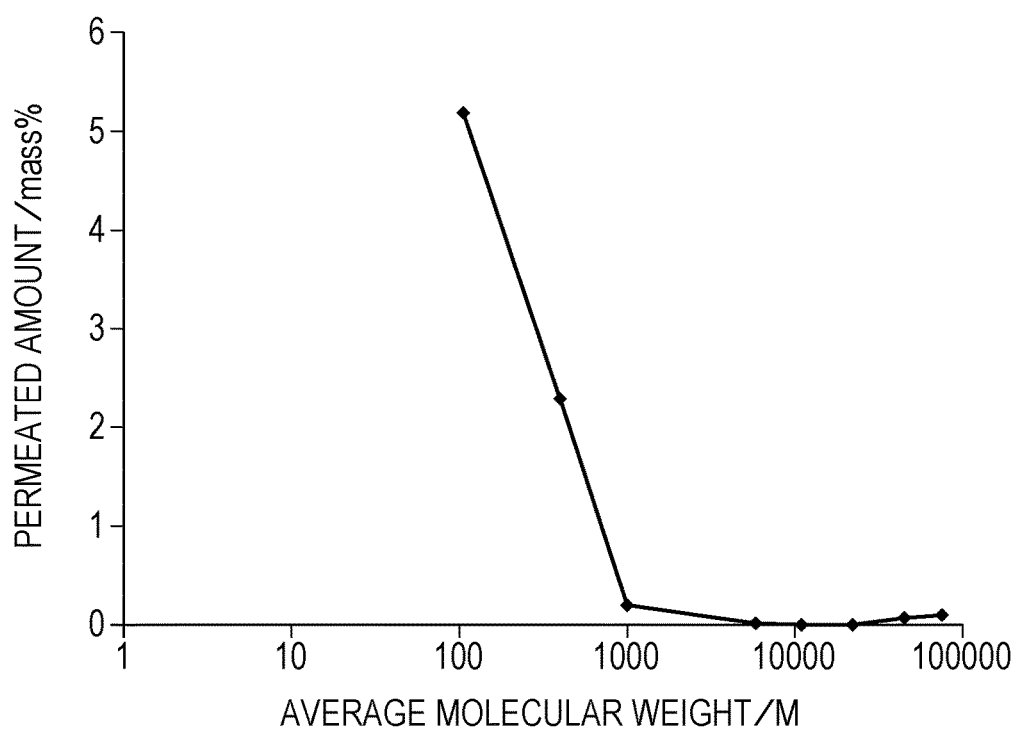
FIG. 3 is a graph showing a relation between a molecular weight of an additive and permeability for the additive in the permeation test.

Further, the case in which the additive concentrations in the two chambers were the same (the permeated amounts equivalent to the content of the additive were each 5% by mass) was taken as permeability of 100% to determine permeability of the grafted membrane for each additive. The results thereof are shown in Table 1 and FIG. 3.

TABLE 1

| Additive | Molecular Weight | Permeated Amount on the Additive Equivalent Basis mass % | Permeability | Permeated Amount on the Additive Equivalent Basis mass % | Permeability |
|---|---|---|---|---|---|
| Polyethylene glycol | 400 | 2.3 | 46% | | |
| Polyethylene glycol | 1000 | 0.21 | 4.1% | 5.10 | 102% |
| Polyvinyl alcohol | 5800 | 0.018 | 0.4% | | |
| Polyvinyl alcohol | 11000 | 0.023 | 0.5% | | |
| Polyvinyl alcohol | 22000 | 0.013 | 0.3% | 0.55 | 11% |
| Modified polyvinyl alcohol | 44000 | 0.040 | 0.8% | | |
| Modified polyvinyl alcohol | 75000 | 0.072 | 1.4% | | |

Modified vinyl alcohol: modified by substituting a hydroxyl group with another hydrophilic functional group As a result of the permeation test, it was found that the permeability of the membrane decreases as the molecular weight of the additive increases, and the membrane has selective permeability based on a molecular weight. In addition, in the present invention, the case of not having permeability is defined as the case of exhibiting permeability less than 5% in the above-mentioned permeation test. That is, it is said that the membrane used in the present experiment exhibits selective permeability for the additive having a molecular weight of 1000 or more. Further, the permeation test of a 4M potassium hydroxide solution was performed by the same method as the above method, and consequently it was found that potassium ions and hydroxide ions permeate the membrane.

Accordingly, a storage battery can be obtained which keeps the concentration of the additive in a region on the negative electrode side higher than the concentration in a region on the positive electrode side by arranging, in a region on the negative electrode side, an electrolyte containing an additive which enhances battery characteristics, arranging, in a region on the positive electrode side, an electrolyte containing the additive which is less than that in a region on the negative electrode side, and using the membrane as a separator.

As the additive according to the present invention, any of an inorganic substance and an organic substance may be used as long as the separator exhibits the selective permeability for the substance. Among these substances, the organic substance easily generates gas such as carbon dioxide by decomposition on the positive electrode, and therefore it easily causes disadvantages that deformation of a battery occurs in a sealed battery. Thus, it is preferred that the additive is combined with a separator having selective permeability since it is easy to ensure a flexibility of battery design, for example, facilitating sealing of a battery even when the organic substance additive is used.

The additive may be any additive as long as it has performance for enhancing charge-discharge characteristics of the storage battery. The additive is preferably one which enhances charge-discharge characteristics of the negative electrode, and particularly preferably a substance capable of reducing the solubility of the metal capable of forming a dendrite and the metal compound thereof in the electrolyte by having a function of forming a stable coating on the negative active material, or like. For example, it is possible to use the additives disclosed in JP-A-2013-84349, JP-A-2009-93983, JP-A-2003-297375 and JP-A-2014-199815.

Herein, the charge-discharge characteristics of the storage battery and the negative electrode can include not only cycle characteristics but also characteristics such as input/output resistance and capacity retention in a charged state. Further, when the additive enhancing charge-discharge characteristics of the negative electrode is used, the effect of the present invention is higher in which a concentration of the additive on the negative electrode side is high.

The additive can move in the electrolyte through diffusion or migration, and can move in the electrolyte in a state where a storage battery is left at rest without charging or discharging. That is, an additive that is gelated and fixed in the vicinity of the negative electrode and therefore cannot move to the vicinity of the positive electrode is not included in the scope of the present invention. Further, a liquid electrolyte having flowability can be used since the additive as described above is not fixed to the vicinity of the negative electrode. Herein, a liquid electrolyte is one having flowability above a certain level. An electrolyte that causes the additive to be fixed in the vicinity of the negative electrode and prevents the additive from moving to the vicinity of the positive electrode, as described above, is not included in the scope of the present invention.

The viscosity of the electrolyte in a region of the additive on a negative electrode side is preferably not too high. By employing a viscosity at which the electrolyte has the flowability, ion conductivity can be enhanced and charge-discharge resistance of a storage battery can be reduced. Further, when the flowability of the electrolyte is high, the additive on the negative electrode side easily moves to the positive electrode side, and therefore an effect of the separator having selective permeability of suppressing additive movement is remarkable. On the other hand, as shown in Comparative Example 4 described later, in the electrolyte which has a viscosity beyond 70 Pa·S and is gelated by addition of a gelating agent having a molecular weight of 220000, the additive as the gelating agent cannot move in the electrolyte through diffusion or migration, and therefore there is not a remarkable effect by using the separator having selective permeability.

The additive on the negative electrode side preferably has a molecular weight which is not too small so that the effect of the selective permeability of the separator is enough. The molecular weight is preferably 1000 or more, and more preferably 5000 or more.

On the other hand, as described above, if an additive having a large molecular weight is added, the viscosity of the electrolyte tends to increase to gelate the electrolyte or solubility of the additive tends to decrease to make it difficult to add an adequate amount. In such a case, for example, it is possible to disarrange crystallinity by substituting a monomer of a part of a homopolymer with another monomer, or increase the solubility of the additive having a large molecular weight by introducing a functional group which is higher in a hydrophilic property.

The present invention is applicable to any of a storage battery having an aqueous electrolyte and a storage battery having a nonaqueous electrolyte if the storage battery is one having a negative electrode including, as an active material, at least one of a metal capable of forming a dendrite and a metal compound thereof. Hereinafter, an alkaline secondary battery in which the electrolyte is an alkaline electrolyte solution will be described.

In the alkaline secondary battery according to the present invention, the negative electrode preferably contains zinc, magnesium, aluminum or an alloy thereof. In the case of a zinc negative electrode, the active material is preferably one or both of zinc oxide (ZnO) and metal zinc (Zn).

The negative electrode can be prepared, for example, by adding water, polytetrafluoroethylene and a binder such as a styrene butadiene rubber to a powder of the above-mentioned negative active material, a powder of acetylene black, and PbO or the like to prepare a paste, filling the paste into a substrate of foamed copper, foamed nickel or the like or applying the paste to a holed steel sheet, adequately drying the paste, and then subjecting the resulting material to roll forming and cutting them.

In the alkaline secondary battery according to the present invention, the positive electrode is preferably nickel, silver oxide-manganese, air or the like. In the present invention, by applying the separator having selective permeability to the additive, it is possible to inhibit the additive in the region on the negative electrode side from permeating to the region on the positive electrode side, and therefore a positive electrode whose maximum operating voltage is 0.4 V or more relative to a potential of an electrode of Hg/HgO can be used. For example, as the positive electrode, a nickel electrode composed of a metal hydroxide containing nickel oxyhydroxide as a main component and a current collector of foamed nickel or the like; an air electrode composed of a carbon material, an oxygen reduction catalyst and a binder; or the like can be used.

An additive amount of the additive in a region on the negative electrode side varies depending on composition or a molecular weight of the additive. In accordance with Examples described later, the amount is preferably 1 g or more as a lower limit, more preferably 2.5 g or more, and particularly preferably 5 g or more with respect to 100 ml of the electrolyte. The amount is preferably 15 g or less as an upper limit, more preferably 12.5 g or less, and particularly preferably 10 g or less.

When the additive amount is 1 g/100 ml of electrolyte or more, charge-discharge cycle performance can be improved, and when the additive amount is 15 g/100 ml of electrolyte or less, an excessive increase of viscosity of the electrolyte can be prevented.

As the electrolyte in the present invention, for example, a solution obtained by dissolving a hydroxide of an alkali metal in water can be used, and examples of the hydroxide of an alkali metal include KOH, NaOH, LiOH and the like, and these compounds may be used alone or in combination of two or more thereof. The concentration of the hydroxide is preferably 3M or more as a lower limit, and more preferably 4M or more. The concentration is preferably 9M or less as an upper limit, and more preferably 6M or less. When the concentration of the hydroxide is 3M or more, self-discharge can be suppressed, and when the concentration is 9M or less, an increase of viscosity of the electrolyte can be suppressed.

When the negative electrode contains zinc or an alloy thereof, the electrolyte preferably contains zinc oxide in a saturated concentration. When the negative electrode contains zinc oxide, elution of zinc contained in the negative electrode can be suppressed.

The separator according to the present invention can be a semipermeable membrane which is obtained by irradiating a polyolefin substrate film such as polyethylene, polypropylene or the like with electron beams accelerated by an electron beam accelerator in a nitrogen atmosphere to generate radicals, and immersing the substrate film in a deoxidized acrylic acid solution to perform graft polymerization. This membrane is an anion-exchange membrane which the OH ions selectively permeate.

When polyolefin is used as a substrate, a separator having high oxidation resistance and high alkali resistance can be formed. Further, in order to adjust a water penetration rate or an air permeability, a nonwoven fabric or a microporous membrane may be laminated on the membrane for use.

When the present invention is applied to a storage battery having a nonaqueous electrolyte, the negative electrode preferably includes lithium or a lithium alloy as an active material. As the lithium alloy, an alloy obtained by alloying lithium with Al, Sn, Bi, In, Ag or the like can be used.

As the active material of the positive electrode, transition metal compounds such as manganese dioxide and vanadium pentoxide, transition metal chalcogenide such as iron sulfide and titanium sulfide, lithium transition metal composite oxides of a α-NaFeO$_2$ type represented by Li$_{1+x}$MeO$_2$ (1≤x, Me is one or more transition metals selected from among Co, Ni and Mn) or a spinel type such as LiMn$_2$O$_4$, compounds obtained by substituting a transition metal site or a lithium site of these composite oxides with a metal element such as Al, V, Fe, Cr, Ti, Zn, Sr, Mo, W or Mg or with a non-metal element such as P or B, and phosphate compounds of an olivine type such as LiFePO$_4$ can be used.

A nonaqueous solvent used for the nonaqueous electrolyte can be selected from solvents commonly used in a nonaqueous electrolyte battery. Examples of the nonaqueous solvent include, but are not limited to, cyclic carbonic acid esters such as propylene carbonate, ethylene carbonate, butylene carbonate, chloroethylene carbonate, and vinylene carbonate; cyclic esters such as γ-butyrolactone and γ-valerolactone; chain carbonates such as dimethyl carbonate, diethyl carbonate, and ethylmethyl carbonates; chain esters such as methyl formate, methyl acetate, and methyl butyrate; tetrahydrofuran and derivatives thereof, ethers such as 1,3-dioxane, 1,4-dioxane, 1,2-dimethoxyethane, 1,4-dibutoxyethane, and methyl diglyme; nitriles such as acetonitrile and benzonitrile; dioxolan and derivatives thereof, and ethylene sulfide, sulfolane, sultone and derivatives thereof. These solvent are usually used as a mixture of two or more thereof in order to adjust a dielectric constant, viscosity or an operating temperature region.

Further, examples of an electrolyte salt used for the nonaqueous electrolyte include inorganic ionic salts containing one of lithium (Li), sodium (Na), and potassium (K) such as LiClO$_4$, LiBF$_4$, LiAsF$_6$, LiPF$_6$, LiB(C$_2$O$_4$)$_2$, LiSCN, LiBr, LiI, Li$_2$SO$_4$, Li$_2$B$_{10}$Cl$_{10}$, NaClO$_4$, NaI, NaSCN, NaBr, KClO$_4$, and KSCN; and organic ionic salts such as LiCF$_3$SO$_3$, LiN(CF$_3$SO$_2$)$_2$, LiN(C$_2$F$_5$SO$_2$)$_2$, LiN(CF$_3$SO$_2$)(C$_4$F$_9$SO$_2$), LiC(CF$_3$SO$_2$)$_3$, LiC(C$_2$F$_5$SO$_2$)$_3$, (CH$_3$)$_4$NBF$_4$, (CH$_3$)$_4$NBr, (C$_2$H$_5$)$_4$NClO$_4$, (C$_2$H$_5$)$_4$NI, (C$_3$H$_7$)$_4$NBr, (n-C$_4$H$_9$)$_4$NClO$_4$, (n-C$_4$H$_9$)$_4$NI, (C$_2$H$_5$)$_4$N-maleate, (C$_2$H$_5$)$_4$N-benzoate, (C$_2$H$_5$)$_4$N-phthalate, lithium stearylsulfonate, lithium octylsulfonate, and lithium dodecylbenzenesulfonate, and these ionic compounds may be used alone or in combination of two or more of them.

In the present invention, a nonaqueous electrolyte storage battery is assembled by arranging an electrolyte formed by further adding an additive to the nonaqueous solvent and the electrolyte salt in a region on the negative electrode side defined by the separator, a semipermeable membrane or an ion-exchange membrane, and arranging an electrolyte in which the additive is not added in a region on the positive electrode side. In the storage battery, the concentration of the additive in a region on the negative electrode side is kept higher than the concentration in a region on the positive electrode side due to the selective permeability of the ion-exchange membrane.

EXAMPLES

Example 1

<Preparation of Electrolyte>
A modified polyvinyl alcohol having a molecular weight of 13000 (hereinafter, referred to as "modified PVA-1") as an additive was charged into pure water, stirred, and thereafter further stirred raising the temperature to 90° C. After confirming that the modified PVA-1 was fully dissolved, the modified PVA-1 was cooled to room temperature to prepare an aqueous solution containing an additive.

An alkaline solution including a KOH powder dissolved in pure water was prepared and cooled to room temperature, and then the alkaline solution was mixed with the above-mentioned aqueous solution containing the additive and adjusted so that 5.0 g of the additive was contained in 100 ml of a KOH solution having a concentration of 4M (hereinafter, denoted by "4M KOH").

Moreover, into the resulting solution, a ZnO powder was excessively charged, and the resulting mixture was stirred at 25° C. for 24 hours. Thereafter, a zinc-saturated electrolyte including the additive was prepared by removing an excessive ZnO by filtration. The viscosity of the resulting electrolyte was 4.93 Pa·s.

The viscosity (absolute viscosity) of the electrolyte is a value determined by multiplying a relative viscosity by a density. In addition, in the present experiment, each specific gravity was measured with use of a hydrometer (DMA500 manufactured by Anton Paar Japan K.K.). The relative viscosity was measured with use of a viscometer (AMVn manufactured by Anton Paar Japan K.K.). A measurement temperature of the specific gravity and the relative viscosity was 20° C.

<Preparation of Electrode>
Predetermined amounts of a ZnO powder, acetylene black (AB), and a PbO powder were weighed and stirred. Thereafter, water and a polytetrafluoroethylene (PTFE) dispersion were added, and the resulting mixture was further stirred to prepare a paste. The solid content of the paste was adjusted so that a solid content was composed of ZnO, AB, PTFE and PbO in proportions of 88:5:5:2 (% by mass) and a moisture percentage was 65% by mass with respect to the entire paste. The paste was filled into a foamed copper substrate having a thickness of 100 mm and a density per unit area of 0.45 g/cm$^2$, and adequately dried, and then the resulting material was subjected to roll forming. Thereby, a sheet of ZnO electrode having a thickness of 0.35 mm was obtained. The substrate was cut into a size of 2 cm×2 cm to obtain a ZnO electrode (hereinafter, referred to as a "zinc electrode"). The filled amount of the paste was adjusted so that a theoretical capacity of the zinc electrode was 100 mAh.

A sinter-type nickel electrode with excessive capacity was used for the positive electrode.

<Preparation of Ion-Exchange Membrane>
A crosslinked polyethylene film having a thickness of 25 μm was irradiated with electron beams by 100 kGy (kilogray) at an accelerated voltage of 300 kV and at a beam current of 10 mA by an electron beam accelerator in a nitrogen atmosphere, and immersed, at room temperature for 3 hours, in a solution composed of 20 parts by weight of acrylic acid, 79 parts by weight of water and 1 part by weight of a Mohr's salt which had previously been deoxidized by nitrogen to obtain an ion-exchange membrane formed by graft polymerization.

<Preparation of Test Cell>
The zinc electrode thus prepared was packed in the form of a bag using the above-mentioned ion-exchange membrane. Further, a nonwoven fabric made of fibers of polypropylene and polyethylene was overlaid thereon in the form of a bag to form a separator. The above-mentioned electrolyte including the additive added was injected into the bag of the ion-exchange membrane to such an extent that the electrode was adequately immersed. A positive electrode was arranged on both sides of the zinc electrode, and these electrodes were put in a container, and an alkaline electrolyte of the 4M KOH not including the additive added was injected into a region on the positive electrode side of the container to such an extent that the positive electrode was adequately immersed. Further, a Hg/HgO electrode was disposed as a reference electrode. Thereafter, the container was left at rest until the electrolyte adequately permeated the electrode. Thereby, an open-type test cell according to Example 1 was prepared.

Example 2

A test cell according to Example 2 was prepared in the same manner as in Example 1 except that the additive in the electrolyte in a region on a zinc electrode side was a modified polyvinyl alcohol having a molecular weight of 10000 (hereinafter, referred to as "modified PVA-2"). The viscosity of the electrolyte including the additive added in a region on a zinc electrode side was 2.40 Pa·s.

Example 3

A test cell according to Example 3 was prepared in the same manner as in Example 1 except for preparing an electrolyte in a region on a zinc electrode side by adding 10.0 g of the modified PVA-2 used in Example 2 to 100 mL of 4M KOH. The viscosity of the electrolyte in a region on a zinc electrode side was 3.79 Pa·s.

Comparative Examples 1 and 2

Test cells according to Comparative Examples 1 and 2 were prepared in the same manner as in Examples 1 and 2, respectively, except for packing the zinc electrode with a polypropylene microporous membrane (pore size according to a mercury intrusion method: 0.043 μm) having a thickness of 25 μm in place of the ion-exchange membrane used in Example 1.

In addition, a permeation test was carried out using the above-mentioned microporous membrane, and consequently, 11% of polyvinyl alcohol having a molecular weight of 22000 permeated the microporous membrane. That is, it was found that the microporous membrane did not have the selective permeability in the present invention for the additive having a molecular weight of 22000.

Comparative Example 3

A test cell according to Comparative Example 3 was prepared in the same manner as in Example 1 except for changing the electrolyte in a region on a zinc electrode side to an electrolyte in which the additive was not added. The viscosity of the electrolyte was 1.50 Pa·s.

Comparative Example 4

Polyacrylic acid (1 g) having a molecular weight of 220000 (hereinafter, referred to as "PAA") was added to 100 ml of the 4M KOH, and consequently, a gel-like electrolyte having a viscosity exceeding 70 Pa·s was obtained. A test cell according to Comparative Example 4 was prepared in the same manner as in Example 1 except that the gel-like electrolyte was used.

<Evaluation of Cycle Characteristics>

Cycle tests were carried out in an environment of 25° C. repeating the following charge-discharge conditions on the test cells of Examples 1 to 3 and Comparative Examples 1 to 4.

A current was set to 0.5 CmA (50 mA), and the test cell was charged to 50 mAh at a constant current constant voltage (limited potential: 1.55 V), rested for 5 minutes, and then discharged so as to be −0.8 V relative to a reference electrode. A cycle test was performed under the above-mentioned conditions, and the number of cycles in which the test cell reached 80% or less of an initial capacity was defined as a cycle life, and the test cell was evaluated based on the cycle life.

The results of the cycle test are shown together with the molecular weight and additive amount of each additive, the separator on the zinc electrode side, and the viscosity of the electrolyte on the zinc electrode side in Table 2 described below.

TABLE 2

| | Additive | Molecular Weight | Additive Amount g/100 mL | Separator | Cycle Life | Viscosity of Electrolyte Pa · s |
|---|---|---|---|---|---|---|
| Example 1 | Modified PVA-1 | 13000 | 5.0 | Ion-exchange membrane | 140 | 4.93 |
| Example 2 | Modified PVA-2 | 10000 | 5.0 | Ion-exchange membrane | 120 | 2.40 |
| Example 3 | Modified PVA-2 | 10000 | 10.0 | Ion-exchange membrane | 160 | 3.79 |
| Comparative Example 1 | Modified PVA-1 | 13000 | 5.0 | Microporous membrane | 90 | 4.93 |
| Comparative Example 2 | Modified PVA-2 | 10000 | 5.0 | Microporous membrane | 90 | 2.40 |
| Comparative Example 3 | None | — | 0.0 | Ion-exchange membrane | 60 | 1.50 |
| Comparative Example 4 | PPA | 220000 | 1.0 | Ion-exchange membrane | 40 | Gelated (exceeding 70) |

In each of the test cells according to Examples 1 to 3 and Comparative Examples 1 to 2, the additive for suppressing the formation of dendrite was added to the electrolyte in a region on the zinc electrode side. However, in each of the test cells according to Comparative Examples 1 to 2 including a separator formed by laminating the microporous membrane on the nonwoven fabric, it is thought that the additive easily permeated the separator to a region on the positive electrode side and underwent oxidative decomposition due to a high potential, and therefore addition effect did not continue, and the number of cycles reaching the cycle life was low.

In contrast with this, in each of the test cells according to Examples 1 to 3 including the ion-exchange membrane for the separator, it is thought that although OH ions permeate the ion-exchange membrane, the ion-exchange membrane has the selective permeability (semipermeability) in which the permeability for the additive is lower than that for OH ions, and therefore the permeation of the additive to a region on the positive electrode side was suppressed to maintain a concentration of an organic additive on the zinc electrode side, and thereby the cycle life was long.

In the test cell according to Comparative Example 3, the additive which provides an effect of suppressing the forming of dendrite was not added to the electrolyte on the zinc electrode side. Even though the ion-exchange membrane was used for the separator, the cycle life was short.

In the test cell according to Comparative Example 4, since the electrolyte was gelated, the additive did not move in the electrolyte through diffusion or migration to undergo oxidative decomposition on the positive electrode, and therefore there was not a remarkable effect of the separator having selective permeability.

The storage battery according to the present invention can inhibit the additive added to the electrolyte in the region on the negative electrode side from permeating to the positive electrode, since the storage battery includes a separator made of a semipermeable membrane or an ion-exchange membrane which permeates ions contributing to a battery reaction but does not permeate the additive in the electrolyte solution. Accordingly, it is possible to suppress the forming of dendrite from the metal contained in the negative electrode to remarkably improve a cycle life by keeping the concentration of the additive in a region on the negative electrode side higher than the concentration in the region on the positive electrode side. Therefore, the storage battery is expected to be used as a power supply of electronic equipment, electric vehicles and the like.

What is claimed is:

1. A storage battery comprising:
   a negative electrode including, as an active material, at least one of a metal capable of forming a dendrite and a metal compound thereof;
   a positive electrode;
   a separator; and
   an electrolyte containing an additive,
   wherein the additive can move in the electrolyte through diffusion or migration,
   a concentration of the additive in the electrolyte in a region on a side of the negative electrode defined by the separator is higher than a concentration of the additive in a region on a side of the positive electrode, and the electrolyte is an alkaline electrolyte solution.

2. The storage battery according to claim 1, wherein the separator is a semipermeable membrane.

3. The storage battery according to claim 1, wherein the separator is an ion-exchange membrane.

4. The storage battery according to claim 1, wherein the additive is a substance capable of enhancing charge-discharge characteristics of the negative electrode.

5. The storage battery according to claim 1, wherein the additive is a substance capable of reducing the solubility of at least one of the metal capable of forming a dendrite and the metal compound thereof in the electrolyte.

6. The storage battery according to claim 1, wherein the additive is an organic substance.

7. The storage battery according to claim 1, wherein a viscosity of the electrolyte in the region on the negative electrode side is 70 Pa·s or less.

8. The storage battery according to claim 1, wherein the maximum operating potential of the positive electrode is 0.4 V or more relative to a potential of an electrode of Hg/HgO.

9. The storage battery according to claim 1, wherein the separator is an anion-exchange membrane.

10. The storage battery according to claim 1, wherein the separator is an ion-exchange membrane, and the ion-exchange membrane contains polyolefin as a substrate.

11. A storage battery comprising:
a negative electrode including, as an active material, at least one of a metal capable of forming a dendrite and a metal compound thereof;
a positive electrode;
a separator; and
an electrolyte containing an additive,
wherein the additive can move in the electrolyte through diffusion or migration,
a concentration of the additive in the electrolyte in a region on a side of the negative electrode defined by the separator is higher than a concentration of the additive in a region on a side of the positive electrode, and
the separator is a grafted membrane.

* * * * *